United States Patent

[11] 3,630,017

| [72] | Inventor | Frederic Marti |
| | | Nyon, Switzerland |
| [21] | Appl. No. | 98,729 |
| [22] | Filed | Dec. 16, 1970 |
| [45] | Patented | Dec. 28, 1971 |
| [73] | Assignee | Portescap |
| | | LaChaux-de-Fonds, Switzerland |
| [32] | Priority | Dec. 17, 1969 |
| [33] | | Switzerland |
| [31] | | 18999/69 |

[54] APPARATUS FASTENING THE END OF A WATCH BALANCE SPRING
9 Claims, 3 Drawing Figs.

[52] U.S. Cl. ............................................. 58/113
[51] Int. Cl. ........................................... G04b 17/14
[50] Field of Search ............................... 58/113, 115, 109

[56] References Cited
FOREIGN PATENTS

| 1,012,356 | 4/1952 | France ................... | 58/113 |
| 176,164 | 1/1906 | Germany ................ | 58/113 |
| 884,316 | 7/1953 | Germany ................ | 58/113 |
| 923,599 | 2/1955 | Germany ................ | 58/113 |
| 1,220,796 | 7/1966 | Germany ................ | 58/113 |
| 336,762 | 4/1959 | Switzerland ............ | 58/113 |

Primary Examiner—Richard B. Wilkinson
Assistant Examiner—Stanley A. Wal
Attorney—Curtis, Morris & Safford ABSTRACT: In a watch having a balance spring and a balance cock, apparatus is provided for fastening the free end of the spring to the cock. The fastening apparatus includes a bearing block, pivotally mounted on the cock, having a generally vertically extending bearing surface for engagement with the spring. A resilient clamping member is mounted on the cock and includes a clamping arm positioned in spaced relation to the bearing surface to define a space therebetween which receives the free end of the balance spring. A fastening screw extends through the clamping arm in threaded engagement with the bearing block and has a head portion engaged with the clamping arm on the side thereof opposite the spring for urging the clamping arm towards the bearing surface when the screw is tightly threaded in the block to thereby clamp the spring between the clamping arm and the bearing surface.

PATENTED DEC 28 1971 3,630,017

INVENTOR.
FREDERIC MARTI
BY
Curtis, Morris & Safford

APPARATUS FASTENING THE END OF A WATCH BALANCE SPRING

This invention relates to watches and more particularly to a fastening device for securing the free end of a watch balance cock.

Fastening devices of the above type have previously been proposed in which a flexible tongue is mounted on the balance cock in spaced relation with the bearing block and cooperates with one end of a screw threaded in the cock in parallel relation with the tongue. The free end of the spring is positioned in the slot between the tongue and the bearing block and the screw rests against the tongue to hold the spring between the tongue and the block. This arrangement, however, does not make it possible to clamp the end of the spring in such a manner as to hold the spring rigidly in place since the spring is positioned adjacent the free end of the flexible tongue and thus may escape from between the tongue and the bearing block. In addition, a device of this character is relatively difficult to manufacture particularly in watches of small sizes.

Another previously proposed arrangement for fastening the watch balance spring includes a curved plate screwed at one end to a rigid block on the watch cock with the spring positioned between the other end of the plate and the block. Here again, the fastening is not positive and the spring is merely held by frictional engagement between the curved plate and the bearing block so that the spring may work loose therefrom.

Accordingly, it is an object of the present invention to overcome the drawbacks of the previously proposed spring fastening arrangements.

It is another object of the present invention to rigidly secure the free end of a watch balance spring to the balance cock.

Yet another object of the invention is to provide a balance spring fastening arrangement which is both simple and inexpensive in construction.

In accordance with an aspect of this invention, a balance spring fastening arrangement for a watch is provided in which a bearing block is pivotally mounted on the balance cock and has a generally vertically extending bearing surface adapted to engage the free end of the balance spring. A generally L-shaped clamping member is mounted on the cock with its first arm positioned between the cock and the bearing block and its second or clamping arm positioned in parallel spaced relation to the bearing surface to define a space therebetween in which the free end of the balance spring is inserted. The clamping member is formed of a resilient material and a fastening screw extends through the clamping arm into threaded engagement with the bearing block. The fastening screw has a head engaged with the clamping arm on the side thereof opposite the spring so that when the screw is tightly threaded in the bearing block the head urges the clamping arm towards the bearing surface to clamp the spring between the arm and the bearing surface.

The above and other objects, features, and advantages of this invention, will be apparent in the following detailed description of an illustrative embodiment thereof which is to be read in connection with the accompanying drawings wherein.

Figure 1:
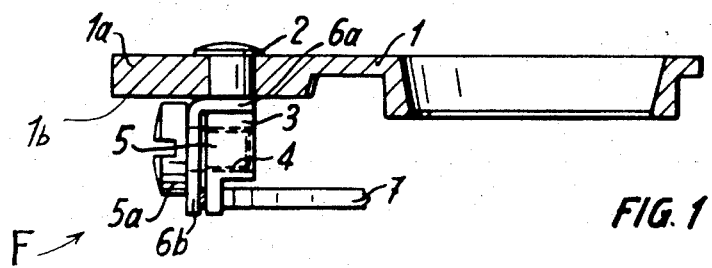
FIG. 1 is a side sectional view of a watch cock and balance spring fastening apparatus according to an embodiment of the present invention.

Referring to the drawings in detail, ans initially to FIG. 1 thereof, it will be seen that a balance spring fastening apparatus F embodying the present invention, as shown therein, is mounted in a pivot holder lug 1a of a balance cock 1 by a rivet 2. Rivet 2 is pivotally mounted in lug 1a and has a bearing block 3 rigidly secured to the free end thereof with the upper surface sa of block 3 in slightly spaced relation with the bottom surface 1b of the lug.

Figure 2:
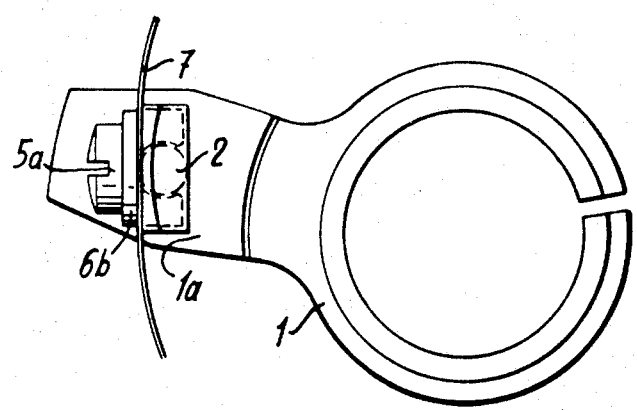
FIG. 2 is a bottom view of the assembly shown in FIG. 1.
Figure 3:
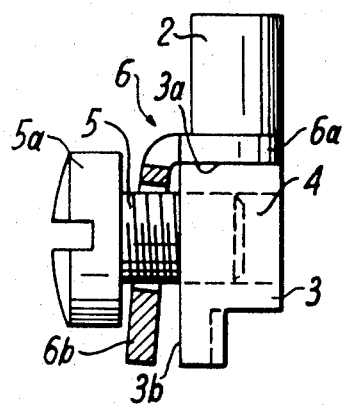
FIG. 3 is an enlarged view of the fastening device illustrated in FIG. 1 in its relaxed configuration with the balance spring removed therefrom.

A generally L-shaped clamping member 6, which is formed of a resilient material, is mounted on lug 1a in conjunction with bearing block 3. The horizontal arm 6a of clamping member 6 is pivotally mounted, as seen in FIGS. 2 and 3, on rivet 2 between the lower surface 1b of lug 1a and the upper surface 3a of bearing block 3. Clamping member 6 also includes a generally vertically extending arm 6b which, as seen in FIG. 3, is positioned in spaced relation to the generally vertically extending bearing surface 3b of bearing block 3. The angle formed between arms 6a and 6b of clamping member 6 in the relaxed configuration thereof is slightly more than 90°, and preferably is chosen to be 95°, so that sufficient space is provided between clamping arm 6b and bearing surface 3b to receive the free end of balance spring 7.

Bearing block 3 is provided with a tapped hole 4 in which a fastening member or screw 5 is threadably engaged. The shank of screw 5 extends through an aperture provided in clamping arm 6b and is threadably engaged in tapped hole 4. The head 5a of screw 5 is positioned on the side of clamping arm 6b opposite the side thereof which engages spring 7 so that, when screw 5 is threaded tightly within hole 4, clamping arm 6b is urged against spring 7 to hold the latter firmly between clamping arm 6b and bearing surface 3b.

It is noted that the diameter of head 5a is approximately equal to the length of clamping arm 6b so that, as seen in FIG. 1, in the clamped position of the device a substantial portion of spring 7 is located directly beneath head 5a whereby the spring is firmly clamped between clamping arm 6b and bearing surface 3b by the direct action of the forces applied by the head. In this manner the spring is directly clamped and is not merely frictionally held in place as in previously proposed arrangements.

Because of the resilient construction of clamping member 6, the clamping member in its relaxed configuration provides sufficient space to readily permit movement of spring 7 between clamping arm 6b and bearing surface 3b so that adjustment of the clamped position of spring 7 is facilitated. In addition, when the watch is to be repaired, the repairman merely loosens screw 5a and clamping arm 6b returns to its relaxed configuration to fully free the spring for adjustment or replacement thereof.

It is thus seen that a novel and efficient clamping apparatus is provided which directly and rigidly secures balance spring 7 to the balance cock while also providing an arrangement wherein the spring is readily removed from the clamping device for adjustment or replacement. Moreover, by this construction the end of spring 7 is inserted from below the balance cock rather than from the side or the top and thus provides a more convenient and readily operable clamping system from those previously proposed.

Bearing surface 3b of block 3 has been shown in the drawings as being relatively flat, however, it is noted that this surface may be slightly convex in the direction of spring 7 so that it will accommodate the curvature of the end of the spring and thus not effect the spring characteristics.

It is also noted that because of the pivotal mounting of rivet 2 in lug 1a, which mounting provides a slight and smooth frictional resistance, bearing block 3 is permitted to turn slightly when spring 7 is clamped between clamping arm 6b and bearing surface 3b so that the spring will pass freely between the pins of the balance spring regulator (not shown). This construction assures proper adjustment of the balance spring by the regulator to achieve proper calibration and operation of the watch.

Although an illustrative embodiment of the present invention has been described herein with reference to the accompanying drawings, It is to be understood that the invention is not limited to that precise embodiment and that various changes and modifications may be effected therein by one skilled in the art without departing from the scope or spirit of this invention.

What is claimed is:

1. Apparatus for clamping the free end of a watch balance spring in a relatively fixed position comprising, a bearing block pivotally mounted in said watch and having a bearing surface for engaging said spring, a resilient clamping member mounted on said watch and having a clamping arm positioned in spaced relation to said bearing surface with said free end of said spring positioned between said clamping arm and said bearing surface, and fastening means extending through said clamping arm and removably secured to said block, said fastening means having an enlarged end portion engaged with said clamping arm on the side of said arm opposite said spring, said enlarged end urging said arm towards said bearing surface when said fastening member is secured to said block whereby said spring is clamped between said arm and said bearing surface.

2. Apparatus as in claim 1 wherein said bearing block is secured to the free end of a pivot pin mounted in said watch and said clamping member comprises a generally L-shaped plate having one arm secured to said pivot pin and the other arm thereof constituting said clamping arm positioned in spaced relation to said bearing surface.

3. Apparatus as in claim 1 wherein said enlarged portion of said fastening means is in generally superimposed relation with said free end of said spring when said fastening member is secured to said block whereby said spring is clamped firmly between said clamping arm and said bearing surface under the direct action of the forces applied by said enlarged portion.

4. Apparatus as in claim 3 wherein said fastening means comprises a screw and said enlarged portion comprises the head thereof.

5. Apparatus for securing the free end of a watch balance spring to the watch balance cock comprising, a bearing block mounted on said cock and having a generally vertically extending bearing surface for engaging said spring, a resilient clamping member, mounted on said cock, having a clamping arm positioned in spaced relation to said bearing surface with the free end of said balance spring positioned between said clamping arm and said bearing surface, and a fastening screw extending through said clamping arm and threadably engaged with said bearing block, said screw having a head engaged with said clamping arm on the side thereof opposite said spring for urging said clamping arm towards said bearing surface when said screw is tightly threaded in said block whereby said spring is clamped between said clamping arm and said bearing surface.

6. Apparatus as in claim 5 wherein said clamping member comprises a generally L-shaped member having one arm thereof positioned between said cock and said bearing block and the other arm thereof forming said clamping arm and positioned in spaced relation to said bearing surface.

7. Apparatus as in claim 6 wherein said clamping member is formed of a resilient material and the angle formed between the arms thereof in their related configuration is larger than 90° to define a space between said clamping arm and said bearing block into which space said spring is inserted.

8. Apparatus as in claim 7 wherein said bearing block is pivotally mounted on said cock.

9. Apparatus as in claim 7 wherein said screw head has a diameter approximately equal to the length of said clamping arm whereby a portion of said head is in generally superimposed relation with said spring, when said spring is secured between said clamping arm and said bearing surface, to firmly clamp said spring therebetween under the direct action of the forces applied by said head.

* * * * *